US011718794B2

(12) United States Patent
Snaith et al.

(10) Patent No.: US 11,718,794 B2
(45) Date of Patent: *Aug. 8, 2023

(54) SOLID-LIQUID CRUDE OIL COMPOSITIONS AND FRACTIONATION PROCESSES THEREOF

(71) Applicant: ARQ IP LIMITED, London (GB)

(72) Inventors: Paul Snaith, Tonbridge (GB); John Francis Unsworth, Wrexham (GB)

(73) Assignee: ARQ IP Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/588,939

(22) Filed: Jan. 31, 2022

(65) Prior Publication Data

US 2022/0154076 A1 May 19, 2022

Related U.S. Application Data

(63) Continuation of application No. 15/981,372, filed on May 16, 2018, now Pat. No. 11,319,492, which is a (Continued)

(30) Foreign Application Priority Data

Apr. 4, 2016 (GB) .................................. 1605767
Apr. 29, 2016 (GB) .................................. 1607563

(51) Int. Cl.
*C10G 1/02* (2006.01)
*C10L 1/32* (2006.01)
(Continued)

(52) U.S. Cl.
CPC ............... *C10G 1/02* (2013.01); *C10G 7/00* (2013.01); *C10L 1/322* (2013.01); *C10L 5/04* (2013.01);
(Continued)

(58) Field of Classification Search
CPC .. C10G 1/02; C10G 7/00; B01D 29/00; C10L 1/322; C10L 2290/08; C10L 2290/28; (Continued)

(56) References Cited

U.S. PATENT DOCUMENTS 1,329,493 A 2/1920 Bacon
2,590,733 A 3/1952 Stillman
(Continued)

FOREIGN PATENT DOCUMENTS

CA 1096620 A1 3/1981
CA 1109820 9/1981
(Continued)

OTHER PUBLICATIONS

Ciu et al., "A Novel Process for Preparation of an Ultra-Clean Superfine Coal-Oil Summary", Fuel, 2008, 87, 2296-2303 (Year: 2008).*

(Continued)

*Primary Examiner* — Latosha Hines
(74) *Attorney, Agent, or Firm* — Dinsmore & Shohl LLP

(57) ABSTRACT

A process for the production of a fractionated product is disclosed, comprising providing a solid hydrocarbonaceous material, wherein the material is in particulate form, and wherein at least about 90% by volume (% v) of the particles are no greater than about 500 μm in diameter. The solid hydrocarbonaceous material is combined with an unrefined liquid hydrocarbonaceous material, such as crude oil, in order to create a combined solid-liquid blend; and the combined solid-liquid blend is subjected to fractionation in order to generate one or more fractionation products. Typically the solid hydrocarbonaceous material comprises coal, optionally the coal is ultrafine coal, and suitably the coal is comprised of microfine coal. The coal may be dewatered and deashed prior to combination with unrefined liquid hydro- (Continued)

carbonaceous material. Compositions and products of the process are further provided.

16 Claims, 2 Drawing Sheets

Related U.S. Application Data continuation of application No. PCT/GB2017/050939, filed on Apr. 4, 2017.

(51) Int. Cl.
*C10L 5/04* (2006.01)
*C10G 7/00* (2006.01)
*B01D 29/00* (2006.01)

(52) U.S. Cl.
CPC .......... *B01D 29/00* (2013.01); *C10L 2290/08* (2013.01); *C10L 2290/28* (2013.01); *C10L 2290/54* (2013.01); *C10L 2290/543* (2013.01)

(58) Field of Classification Search
CPC .. C10L 2290/54; C10L 2290/543; C10L 5/04; Y02E 60/10
See application file for complete search history.

(56) References Cited

U.S. PATENT DOCUMENTS

| | | | |
|---|---|---|---|
| 2,754,267 A | 7/1956 | Bondi | |
| 3,327,402 A | 6/1967 | Lamb et al. | |
| 3,854,666 A | 12/1974 | Switzer, Jr. | |
| 4,090,853 A | 5/1978 | Clayfield et al. | |
| 4,239,426 A | 12/1980 | Nakabayashi et al. | |
| 4,251,229 A | 2/1981 | Naka et al. | |
| 4,255,155 A | 3/1981 | Frankovich | |
| 4,265,637 A | 5/1981 | Anderson | |
| 4,282,004 A | 8/1981 | Masologites | |
| 4,306,883 A | 12/1981 | Eckman | |
| 4,309,269 A | 1/1982 | Denker et al. | |
| 4,319,980 A | 3/1982 | Jenkins | |
| 4,330,300 A | 5/1982 | Cairns | |
| 4,334,976 A | 6/1982 | Yan | |
| 4,358,293 A | 11/1982 | Mark | |
| 4,377,392 A | 3/1983 | Massey et al. | |
| 4,382,001 A | 5/1983 | Kulprathipanja et al. | |
| 4,389,219 A | 6/1983 | Naka et al. | |
| 4,396,397 A | 8/1983 | Kugel et al. | |
| 4,417,901 A | 11/1983 | Ando et al. | |
| 4,420,445 A | 12/1983 | Yamamoto et al. | |
| 4,425,135 A | 1/1984 | Jenkins | |
| 4,459,762 A | 7/1984 | Hardesty et al. | |
| 4,511,364 A | 4/1985 | Mitsumori | |
| 4,536,372 A * | 8/1985 | Burgess | B03B 9/005 422/62 |
| 4,537,599 A | 8/1985 | Greenwald, Sr. | |
| 4,552,725 A | 11/1985 | Audeh | |
| 4,671,801 A | 6/1987 | Burgess et al. | |
| 4,780,110 A | 10/1988 | Beshore | |
| 4,783,198 A | 11/1988 | Heuschen | |
| 4,859,209 A | 8/1989 | Szabo nee Mogyorossi et al. | |
| 4,900,429 A | 2/1990 | Richardson | |
| 5,096,461 A | 3/1992 | Frankiewicz et al. | |
| 5,242,470 A | 9/1993 | Salter et al. | |
| 5,379,902 A | 1/1995 | Wen et al. | |
| 5,503,646 A * | 4/1996 | McKenny | C10G 1/02 44/628 |
| 5,902,359 A | 5/1999 | Grosso et al. | |
| 6,083,286 A | 7/2000 | Ono | |
| 6,767,465 B1 | 7/2004 | Choung et al. | |
| 6,793,079 B2 | 9/2004 | Khan et al. | |
| 7,431,744 B2 | 10/2008 | Sugita et al. | |
| 7,537,700 B2 | 5/2009 | Kanda et al. | |
| 8,177,867 B2 | 5/2012 | Joseph et al. | |
| 8,591,607 B2 | 11/2013 | Fleming et al. | |
| 8,610,071 B2 | 12/2013 | Kamba et al. | |
| 9,328,920 B2 | 5/2016 | Sirdeshpande et al. | |
| 9,777,235 B2 * | 10/2017 | Snaith | C10L 1/322 |
| 2007/0028509 A1 | 2/2007 | Dobbs et al. | |
| 2010/0287828 A1 | 11/2010 | Flemming et al. | |
| 2011/0174696 A1 | 7/2011 | Young et al. | |
| 2011/0239973 A1 | 10/2011 | Qin | |
| 2012/0167457 A1 | 7/2012 | Harsh et al. | |
| 2012/0177923 A1 | 7/2012 | Kumara | |
| 2012/0317878 A1 * | 12/2012 | Taulbee | C10L 5/04 44/577 |
| 2013/0152453 A1 | 6/2013 | Baird et al. | |
| 2015/0184099 A1 | 7/2015 | Swensen et al. | |
| 2016/0082446 A1 | 3/2016 | Swensen et al. | |
| 2016/0160141 A1 | 6/2016 | Sakaguchi et al. | |
| 2018/0134977 A1 | 5/2018 | Swensen et al. | |

FOREIGN PATENT DOCUMENTS

| | | |
|---|---|---|
| CN | 1354227 A | 6/2002 |
| CN | 101245918 A | 8/2008 |
| CN | 101397514 A | 4/2009 |
| CN | 101649220 A | 2/2010 |
| CN | 101735871 A | 6/2010 |
| CN | 102434343 A | 5/2012 |
| CN | 105567321 A | 5/2016 |
| CN | 108148610 A | 6/2018 |
| DE | 2849124 A1 | 5/1980 |
| DE | 2849128 A1 | 5/1980 |
| DE | 3130662 A1 | 2/1983 |
| DE | 3200240 A1 | 7/1983 |
| EP | 0012606 A1 | 6/1980 |
| EP | 042727 A2 | 12/1981 |
| EP | 0062220 A2 | 10/1982 |
| EP | 0105236 A2 | 4/1984 |
| EP | 3438048 | 2/2019 |
| FR | 2505711 A1 | 11/1982 |
| GB | 2164271 | 3/1986 |
| JP | S49107002 A | 10/1974 |
| JP | 53117002 A | 10/1978 |
| JP | S53117002 A | 10/1978 |
| JP | 54040808 A | 3/1979 |
| JP | S5440808 A | 3/1979 |
| JP | 54129008 A | 10/1979 |
| JP | S54129008 A | 10/1979 |
| JP | S5582192 A | 6/1980 |
| JP | S55144095 A | 11/1980 |
| JP | 56036589 A | 4/1981 |
| JP | S5636589 A | 4/1981 |
| JP | S5730795 A | 2/1982 |
| JP | S5798595 A | 6/1982 |
| JP | S57147596 A | 9/1982 |
| JP | S57195194 A | 11/1982 |
| JP | S5865790 A | 4/1983 |
| JP | S58152095 A | 9/1983 |
| JP | S60188495 A | 9/1985 |
| JP | 62172093 A | 7/1987 |
| JP | 63048396 A | 3/1988 |
| JP | 2002290673 A | 10/2002 |
| JP | 5582192 B2 | 9/2014 |
| JP | 5730795 B2 | 6/2015 |
| JP | 5780484 B2 | 9/2015 |
| RU | 1838384 C | 8/1993 |
| RU | 2541322 C1 | 2/2015 |
| WO | 2010039315 A1 | 4/2010 |
| WO | 2011084730 A1 | 7/2011 |
| WO | 2015187450 A2 | 12/2015 |
| WO | 2017166920 A1 | 10/2017 |
| WO | 2017174973 A1 | 10/2017 |

OTHER PUBLICATIONS

Chinese Rejection Decision pertaining to Application No. 20161104416.0 dated Feb. 18, 2022.
Chinese Third Office Action pertaining to Application No. 201910//14058 dated Mar. 14, 2022.

(56) References Cited

OTHER PUBLICATIONS

Chinese Fourth Office Action pertaining to Application No. 201780012719 dated Mar. 17, 2022.
Chinese Rejection Decision pertaining to Application No. 201780011283.1 dated Jan. 19, 2022.
Japanese Office Action pertaining to Application No. 2018-539146 dated Apr. 1, 2022.
Japanese Office Action pertaining to Application No. 2018-539158 dated Mar. 16, 2022.
Japanese Office Action pertaining to Application No. 20121-049986 dated Feb. 22, 2022.
U.S. Non-Final Office Action pertaining to U.S. Appl. No. 15/981,372 dated Sep. 6, 2018.
U.S. Non-Final Office Action pertaining to U.S. Appl. No. 15/981,372 dated Sep. 20, 2019.
Baek Se Hyun et al., "The Effect of the Coal Blending Method in a Coal Fired Boiler on Carbon in Ash and N0x Emission", Fuel, IPC Science and Technology Press Guildford, GB, vol. 128, Mar. 6, 2014, pp. 62-70.
International Search Report dated Feb. 6, 2020 for application No. PCT/GB2018/052738 filed Sep. 27, 2019.
Indonesia Office action pertaining to Application No. HKI-3-HI.05.02.01.PID201804937-TA dated Oct. 21, 2020 with English Translation.
Office Action pertaining to U.S. Appl. No. 15/981,372 dated Dec. 10, 2020.
India Office Action pertaining to Application No. 201918033361 dated Jan. 8, 2021.
China Office Action pertaining to Application No. 201780012719 dated Jan. 14, 2021.
Colombia Office Action pertaining to Application No. NC2018/0009147 dated Jan. 8, 2021.
Final Rejection pertaining to U.S. Appl. No. 15/981,372 dated Jun. 9, 2021.
Chinese Office Action pertaining to Application No. CN201780011283A dated Apr. 24, 2021.
Saudi Office Action pertaining to Application No. 518392003 dated Mar. 29, 2021.
European Office Action pertaining to Application No. 17722125.6 dated Jun. 21, 2021.
Saudi Arabia Office Action pertaining to Application No. 518392002 dated May 6, 2002.
Australian Examination Report pertaining to Application No. 2021200237 dated Jun. 24, 2022.
Brazil Office Action pertaining to Application No. BR1120180688185 dated Jul. 12, 2022.
Bartle, et al., "Co-Refining of Coal and Petroleum", Commission of the European Communities, Energy 1991.
British Coal Corporation, "Improvement to Direct Coal Liquefaction", European Commission, Technical Coal Research, 1999.
Curtis et al., "Evaluation of Process Parameters for Combined Processing of Coal with Heavy Crudes and Residual", Ind. Eng. Che., Process Des. Dev., 1985, 1259.
International Search Report and Written Opinion pertaining to PCT/GB2018/050939 dated Jul. 13, 2017.
Office Action pertaining to U.S. Appl. No. 15/981,362 dated Sep. 21, 2018.
Zhichao, L; Yanyan, H; Yawen, D.; Ultra-clean coal's laboratory investigation for the coal preparation plant of Taixi, pp. 1-10, retrieved from http://www.paper.edu.cn/releasepaper/content/20100.-1050.
Wibberly LJ & Osborne D; Premium Coal Fuels with Advanced Coal Benefication; 40th International Technical Conference Clean Coal & Fuel Systems, May 31, Jun. 4, 2015, Sheraton Sand Key, Clearwater, Florida, USA.
Grimanis, Breault, Smit, and Jha: Storage, transportation, and atomization of CWF for residential applications. Final report, Sep. 27, 1989-Nov. 15, 1991, pp. 1-153, retrieved from: https://www.osti.gov/biblio/10112838-storage-transportation-atomiztion-cfw-residential-applications-final-report-september-november.

Search Report pertaining to corresponding Great Britain Patent Application No. GB1815791.7, dated Mar. 1, 2019.
Examination Report pertaining to corresponding Russian Patent Application No. 2018123758/04(037656), dated Jan. 25, 209.
Examination Report pertaining to corresponding Russian Patent Application No. 2018123748/04(037645) dated Jan. 25, 2019.
Clayfield, E., et al., "Colloil Manufacture and Application", Fuel, 1981, 60, 865.
Ciu et al., "A Novel Process for Preparation of an Ultra-Clean Superfine Coal-Oil Summary", Fuel, 2008, 87, 2296-2303.
Nunez, G.A., et al., Colloidal Coal in Water Suspensions, Energy and Environmental Science, 2010, 3(5), 629.
Osborne et al., "Two Decades of Jameson Cell Installations in Coal", 17th International Coal Preparation Congress Instanbul, 1-6, Oct. 2013.
Shaver, Robert G., "A Solvent-Refined Coal Process for Clean Utility Fuel", Advances in Chemistry Series, 1974, 127, 89-90.
Great Britain Search Report pertaining to Application No. GB1607557.4 dated Oct. 13, 2016.
Office Action pertaining to U.S. Appl. No. 16/082,678 dated Nov. 1, 2019.
Trass et al., "Coal Slurry Fuel Technology", The Canadian Journal of Chemical Engineering, Apr. 1987, vol. 65, 177-201 (Year: 1987).
Office Action pertaining to U.S. Appl. No. 16/082,678 dated Apr. 30, 2020.
Examination Report pertaining to Indian Application No. 201817029523 dated Jun. 26, 2020.
Examination Report pertaining to Colombian Application No. 20189998147 dated Jun. 18, 2020.
Office Action pertaining to Chinese Application No. 20161104416.0 dated Jun. 19, 2020.
Office Action pertaining to Japanese Application No. 2018-539158 dated Aug. 2, 2011.
Office Action pertaining to Indonesia Application No. PID201804912 dated Aug. 24, 2020.
Office Action pertaining to Japanese Application No. 2018-539146 dated Aug. 2, 2018.
Office Action pertaining to India Application No. 201817029522 dated Jul. 24, 2020.
Non-Final Office Action dated Oct. 16, 2020, for U.S. Appl. No. 16/999,530, filed Aug. 21, 2010.
Office Action pertaining to Columbia Application No. NC2018/0009148 dated Aug. 21, 2020.
Office Action pertaining to Korean Application No. 9-5-2020-065058002 dated Sep. 21, 2020.
Indonesia Office Action pertaining to Application No. HKI-3-HI 05.02.01.PID201804937-TA Oct. 21, 2020 with English Translation.
China Office Action pertaining to Application No. 2017800112831 dated Oct. 30, 2020 with English Translation.
Japan Office Action pertaining to Application No. 2018-539158 dated Nov. 17, 2020 with English Translation.
Jing et al., "Preparation of Slurry with Colloid Mill and the Effect of the Particle Size of Coal on Direct Liquefaction Properties of the Oil", Coal Conversion, vol. 37, Issue 2, pp. 28-32, Apr. 2014.
China Office Action pertaining to CN2019107714058 dated Dec. 29, 2020.
Japan Office Action pertaining to JP2018-539146 dated Dec. 1, 2020.
Office Action pertaining to U.S. Appl. No. 16/082,678 dated Dec. 23, 2020.
Office Action pertaining to U.S. Appl. No. 16/999,530 dated Oct. 16, 2020.
Office Action pertaining to Australia Application No. 2017246679 dated Jul. 31, 202.
Office Action pertaining to Australia Application No. 20172466780 dated Jul. 30, 2020.
Colombia Office Action pertaining to Application No. NC2018/0009148 dated Feb. 8, 2021.
Korean Office Action pertaining to Application No. 10-2020-7017301 dated Apr. 15, 2021, 7 pages.
China Office Action pertaining to Application No. 2017800112831 dated Aug. 10, 2021.

(56) References Cited

OTHER PUBLICATIONS

China Office Action pertaining to Application No. 2019107714058 dated Jul. 15, 2021.
Examination Report pertaining to Colombian Application No. 20180009148 dated Jul. 23, 2021.
China Office Action pertaining to Application No. 2017800112719 dated Jul. 15, 2021.
Brazil Office Action pertaining to Application No. BR112018068810-0 dated Jul. 21, 2021.
Brazil Office Action pertaining to Application No. BR112018068818-5 dated Jul. 21, 2021.
Chinese Office Action pertaining to Application No. 201611044116.0 dated Aug. 12, 2021.
Notice of Allowance pertaining to U.S. Appl. No. 16/999,530 dated Nov. 16, 2021.
Notice of Allowance pertaining to U.S. Appl. No. 16/082,678 dated Nov. 17, 2021.
Korean Rejection pertaining to Application No. 52018044771 dated Oct. 20, 2021.
Colombia Office Action pertaining to Application No. NC2018/0009147 dated Sep. 15, 2021.
China Rejection pertaining to Application No. 20178001271.9 dated Nov. 3, 2021.
China Rejection pertaining to Application No. 201910771405.8 dated Nov. 4, 2021.
Saudi Arabia Office Action pertaining to Application No. 518392002 dated Nov. 16, 2021.
Notice of Allowance pertaining to U.S. Appl. No. 15/981,372 dated Oct. 14, 2021.
Corrected Notice of Allowability pertaining to U.S. Appl. No. 15/981,372 dated Nov. 3, 2021.
Notice of Allowability pertaining to U.S. Appl. No. 15/981,372 dated Dec. 10, 2021.
Corrected Notice of Allowability pertaining to U.S. Appl. No. 15/981,372 dated Dec. 21, 2021.
Corrected Notice of Allowability pertaining to U.S. Appl. No. 16/082,678 dated Dec. 22, 2021.
Brazil Office Action pertaining to Application No. BR112018068810-0 dated Jul. 6, 2022.
Colombia Office Action pertaining to Application No. 11683 dated Jul. 26, 2022.
Search Report pertaining to United Arab Emirates Application No. P6000958/2018 dated Jun. 10, 2022, 9 pages.
Search Report pertaining to United Arab Emirates Application No. P6000960/2018 dated Jun. 10, 2022, 9 pages.
Office Action pertaining to Canada Application No. 3016978 dated Oct. 24, 2022, 6 pages.
Office Action pertaining to Canada Application No. 3016979 dated Oct. 20, 2022, 4 pages.

* cited by examiner

SOLID-LIQUID CRUDE OIL COMPOSITIONS AND FRACTIONATION PROCESSES THEREOF

BACKGROUND OF THE INVENTION

The invention is in the field of combination products derived from solid with liquid hydrocarbons, particularly the combination of coal with crude oil, in order to create a combined product that may be subject to further refining and processing. In particular, the invention is in the field of introduction of solid hydrocarbons, such as coal, into the crude oil refining process in order to upgrade the solid hydrocarbon and replace a proportion of the crude oil in the refining stream.

Coal fines and ultrafines, including microfines are the small particles of coal generated from larger lumps of coal during the mining and preparation process. While coal fines retain the same energy potential of coal they are generally considered a waste product as the particulate nature of the product renders it difficult to market and transport. Coal fines are therefore generally discarded as spoil close to the colliery forming large waste heaps or contained in large ponds that require careful future management in order to avoid environmental contamination or even the threat to human life as demonstrated in the 1988 Aberfan disaster in South Wales, UK.

Nevertheless, coal fines do offer a cheap and plentiful supply of hydrocarbons particularly rich in carbon. It is known to add slurries of coal fines in water to fuel oils in order to upgrade the coal fine product and reduce the cost per unit volume of the blended fuel oil (see for example U.S. Pat. Nos. 5,096,461, 5,902,359 and 4,239,426). However, in its natural state, coal fines typically contain significant levels of ash-forming components that would render it unsuitable for blending with crude oil. Furthermore, the amount of water present in coal fines (ca. 35% by mass or % m) is also undesirable for use in crude oil. In addition, the sulphur content of coal fines is commensurate with that of crude oil, however lower sulphur crudes are valued more than high sulphur crudes, so any means to reduce sulphur in coal for use with crude oil is desirable. Selecting coal fines with low mineral matter content is one possibility for ameliorating these problems and can be manufactured by crushing and grinding seam coals that are selected to have an inherently low mineral matter content (e.g. <5% m), however, this limits quite substantially the types of coal that can be utilised.

Crude oil is classed as a fossil fuel and is a non-renewable energy source. Furthermore, while oil prices are quite volatile the refined products that are obtained from the crude oil are always significantly more expensive. A way in which crude oil could be blended with a cheap waste material, such as coal fines, to extend the finite reserves of crude oil, and the resultant refined distillate products, would be highly desirable.

These and other uses, features and advantages of the invention should be apparent to those skilled in the art from the teachings provided herein.

U.S. Pat. No. 5,503,646 refers to solid-liquid extraction of crude oil-coal mixtures, with emphasis on upgraded coal products and is specific to low rank coal (lignite and sub-bituminous coal). U.S. Pat. No. 5,503,646 utilises coarse coal particles (150-250 microns (μm)), and solid-liquid extraction techniques to separate solid product from heated slurry. U.S. Pat. No. 5,503,646 does not use distillation.

U.S. Pat. Nos. 5,096,461, 5,902,359, 4,239,426 and 4,309,269 all refer to processes for mixtures of coal and crude oil, as well as water, to enable coal pipeline transportation. U.S. Pat. No. 4,309,269 refers to dissolution of coal within a crude oil-coal slurry, albeit at high pressure.

U.S. Pat. No. 4,900,429 describes a process for manufacturing a synthetic crude by hydrocracking heavy oil, crushed coal and pyrolysed coal volatiles.

JPS54129008, JPS5636589 and JP S5798595 refer to stable dispersions of crude oil and pulverised coal (particle size 50-100 μm) with surfactants. JP2000290673 and U.S. Pat. No. 7,431,744 refer to processes for increasing calorific value of coal by adding crude oil as a slurry or a briquette.

Curtis, C. W. et al. (Evaluation of process parameter for combined processing of coal with heavy crudes and residua (Ind. Eng. Chem. Process Des. Dev., 1985, 24, 1259)) covers co-processing of coal and petroleum crudes/residues in the temperature range 375-475° C., but with a requirement for hydrogen under pressure and with a catalyst. Fractions were solvent extracted and not distilled. CN105567321 and CN101649220 provide other variations of coal liquefaction technology using crude oil as the liquefying solvent, but requiring a catalytic high pressurized hydrogenation unit. Resultant products were solvent extracted, not distilled. Such processes are energy intensive and rely on the presence of a hydrogen atmosphere and catalyst which, if absent, severely reduces conversions of coal to such low yields of upgraded products as to be commercially non-viable.

British Coal Corporation, CEC report EUR 18247 (Improvements to direct coal liquefaction, 1999, ISBN 92-828-5444-2) refers to the direct liquefaction of coal by the co-refining with hydrogenated anthracene oil solvent.

Bartle, K. E. and Taylor, N. CEC report EUR 13168 (Co-refining of coal and petroleum, 1991, ISBN 92-826-2220-7) refers to the direct liquefaction of coal by co-refining with heavy petroleum oil-derived fractions and under one-stage, catalytic hydro-liquefaction conditions.

The present invention addresses the problems that exist in the prior art, not least reducing reliance on crude oil as a source of valuable petrochemicals, as well as altering or expanding the range of valuable fractions obtainable from crude hydrocarbonaceous substrates.

SUMMARY OF THE INVENTION

Accordingly, in a first aspect the invention provides a process for the production of a fractionated product comprising the steps of: (i) providing a solid hydrocarbonaceous material, wherein the material is in particulate form, and wherein at least about 90% by volume (% v) of the particles are no greater than about 500 μm in diameter;

(ii) combining the solid hydrocarbonaceous material with an unrefined liquid hydrocarbonaceous material in order to create a combined solid-liquid blend; and (iii) subjecting the combined solid-liquid blend to fractionation in order to generate one or more fractionation products.

Typically the solid hydrocarbonaceous material comprises coal, optionally the coal is ultrafine coal, and suitably the coal is comprised of microfine coal. Where the coal is ultrafine coal, typically at least 95% by volume (% v) of the particles, optionally 98% v, suitably 99% v are no greater than about 500 μm in diameter. In one embodiment of the invention, the ultrafine coal comprises particles in which typically at least 95% v of the particles, optionally 98% v, suitably 99% v are no greater than about 250 μm in diameter.

In a specific embodiment of the invention the coal comprises microfine coal which comprises particles in which typically at least 95% v of the particles, optionally 98% v, suitably 99% v are no greater than about 100 μm, optionally about 50 μm, and more optionally about 20 μm in diameter. In yet a further embodiment at least 95% v of the particles are less than 10 μm in diameter.

According to one embodiment of the invention the solid hydrocarbonaceous material is subjected to one or more de-watering steps prior to step (i).

According to another embodiment of the invention the solid hydrocarbonaceous material is subjected to at least one ash removal (e.g. demineralisation) step prior to step (i).

In a particular embodiment of the invention the solid hydrocarbonaceous material comprises coal that is selected due to its low inherent ash content. In embodiments the coal has an inherent ash content of less than 20% by mass (% m), suitably less than 10% m, optionally less than 5% m In a specific embodiment of the invention, the unrefined liquid hydrocarbonaceous material comprises, or consists essentially of, crude oil. Suitably the crude oil is a sweet crude oil. Optionally the crude oil is a sour crude oil.

In yet a further embodiment of the invention the solid hydrocarbonaceous material is combined with the liquid hydrocarbonaceous material in order to create a combined solid-liquid blend comprising at most about 60% m (60% by mass) of solid hydrocarbonaceous material, based on the total mass of the combined solid-liquid blend. Suitably, the combined solid-liquid blend comprises at most about 40% m, optionally at most about 30% m, typically at most about 20% m of solid hydrocarbonaceous material, based on the total mass of the combined solid-liquid blend. Suitably, the combined solid-liquid blend comprises at least about 0.01% m, optionally at least about 0.1% m, typically at least about 1% m of solid hydrocarbonaceous material, based on the total mass of the combined solid-liquid blend. In a specific embodiment of the invention, the combined solid-liquid blend comprises at least about 10% m of solid hydrocarbonaceous material, based on the total mass of the combined solid-liquid blend.

In one embodiment of the invention, the fractionation comprises distillation at or around atmospheric pressure. Optionally, distillation is also undertaken at reduced pressure. In an embodiment of the invention, fractionation by way of distillation occurs under atmospheric pressure followed by reduced pressure.

According to an embodiment of the invention, the one or more fractionated products of the process comprises distillate products obtained from both solid hydrocarbonaceous material and the unrefined liquid hydrocarbonaceous material. Suitably the lower distillate products comprise at least one of the group selected from: gasoline; naphtha; kerosene; and diesel.

A specific embodiment of the invention provides that the one or more fractionated product of the process comprises middle distillate products derived from both solid hydrocarbonaceous material and the unrefined liquid hydrocarbonaceous material. Suitably the middle distillate products comprise at least one of the group selected from: marine diesel; light vacuum gas oil; and heavy vacuum gas oil. In yet a further embodiment the invention provides that the one or more fractionated product of the process comprises vacuum residue derived from both solid hydrocarbonaceous material and the unrefined liquid hydrocarbonaceous material. Suitably the vacuum residue comprises asphalt and/or bitumen.

In a specific embodiment of the invention the combined solid-liquid blend product further comprises a dispersant additive.

In yet a further embodiment of the invention, the process provides an increase in total distillate fractions of at least 1% v, suitably at least 2% v and optionally at least 3% v as determined by comparison to an equivalent solid-liquid blend in which the solid particulate material is inert.

A second aspect of the invention provides for a fractionated product obtainable, or obtained, by the process described herein.

A third aspect of the invention provides a process for operating a fractional distiller, the process comprising:

combining a coal fines material, wherein the material is in particulate form, and wherein at least about 95% v of the particles are no greater than about 500 μm in diameter, with a crude oil in order to create a combined solid-liquid blend, wherein the combined solid-liquid blend comprises at least about 0.01% m and at most about 60% m of the coal fines material, based on the total mass of the combined solid-liquid blend;

introducing the combined solid-liquid blend into a fractionation column, or combining coal fines material with the crude oil in situ within a fractionation column, at or around atmospheric pressure; and elevating the temperature of the fractionation column in order to effect fractionation of the combined solid-liquid blend so as to generate one or more fractionation products.

In a further embodiment the one or more of the fractionation products is subjected to a further fractionation under reduced pressure so as to generate one or more reduced pressure (e.g. vacuum) fractionation products.

A fourth aspect of the invention provides a combined solid-liquid blend product comprised of a dewatered ultrafine coal preparation together with a crude oil, wherein dewatered ultrafine coal preparation is characterised in that at least 95% of the particles, optionally 98%, suitably 99% are no greater than about 500 μm in diameter, and wherein the solid-liquid blend comprises at most about 60% m of dewatered ultrafine coal, based on the total mass of the combined solid-liquid blend.

In one embodiment of the invention, the combined solid-liquid blend product comprises ultrafine coal which includes particles in which typically at least 95% of the particles, optionally 98%, suitably 99% are no greater than about 250 μm in diameter.

In a specific embodiment of the invention the dewatered ultrafine coal comprises microfine coal which comprises particles in which typically at least 95% of the particles, optionally 98%, suitably 99% are no greater than about 100 μm, optionally about 50 μm, and more optionally about 20 μm in diameter.

According to a specific embodiment of the invention the dewatered ultrafine coal preparation comprises a low inherent ash content. Suitably the ash content is less than about 20% m of the ultrafine coal preparation, based on the total mass of the combined solid-liquid blend; optionally less than about 15% m, suitably less than about 10% m, typically less than about 5% m, based on the total mass of the combined solid-liquid blend. In one embodiment of the invention the dewatered ultrafine coal preparation is subjected to a de-ashing step prior to combination in the solid-liquid blend product.

A fifth aspect of the invention provides for the use of a combined solid-liquid blend product of as described herein in a fractionation process for generating one or more fractionation products.

It will be appreciated that the invention may be subjected to further combinations of the disclosed features not explicitly recited above.

BRIEF DESCRIPTION OF THE DRAWINGS

The invention is further illustrated by reference to the accompanying drawings in which.

DETAILED DESCRIPTION OF THE INVENTION

Figure 1:
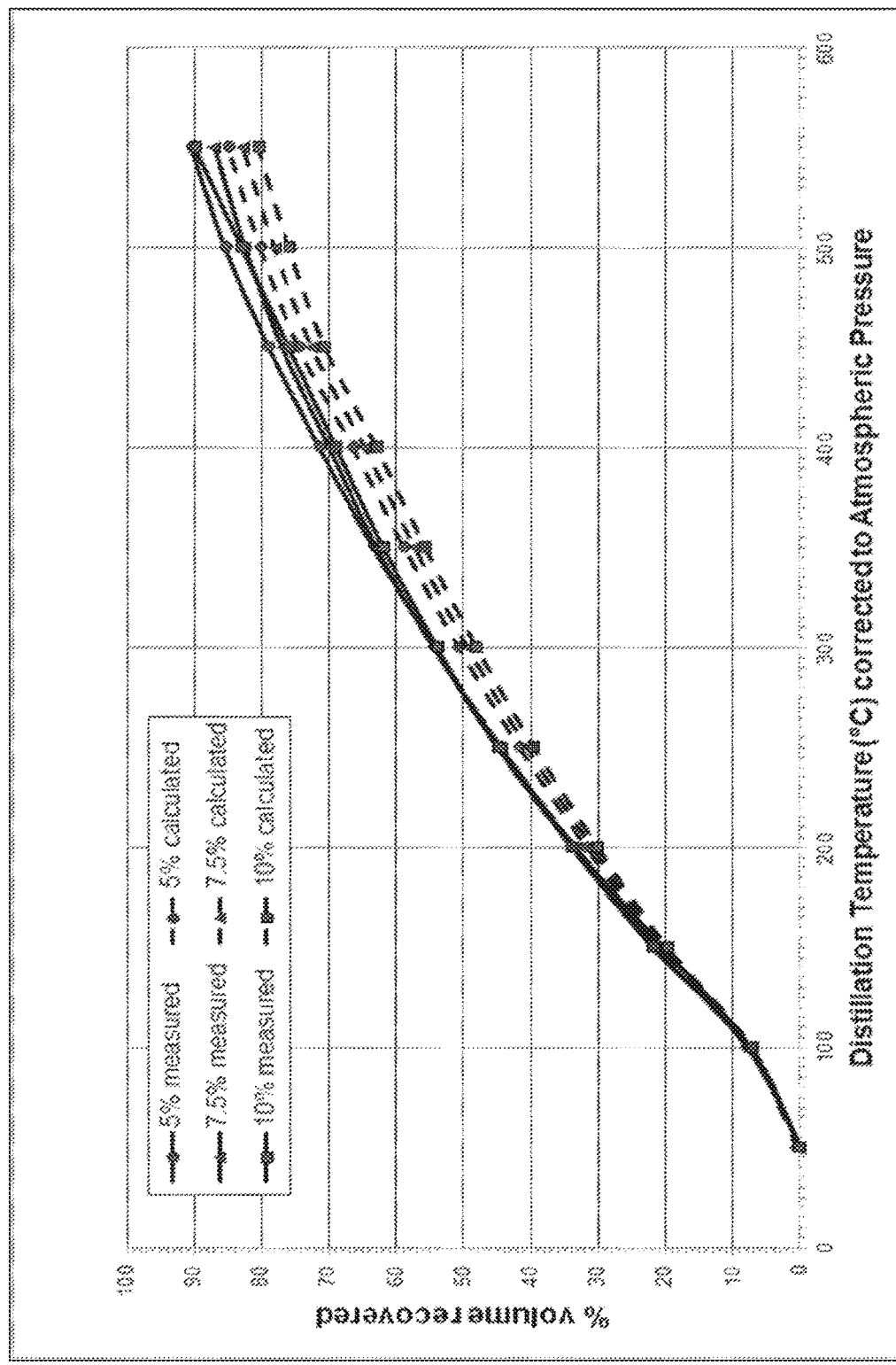
FIG. 1 is a representation of the comparison the mass measured percentage recovery of distillate products (solid lines) for each of the samples in Table 4 to that predicted if no volatile components were released from the coal (dashed lines). A shift to the left for the measured value to the prediction indicates that additional distillate products have been recovered compared to that expected.

All references cited herein are incorporated by reference in their entirety. Unless otherwise defined, all technical and scientific terms used herein have the same meaning as commonly understood by one of ordinary skill in the art to which this invention belongs.

In one embodiment, invention relates to blending de-mineralised (de-ashed), de-watered (dehydrated) coal particulate material (e.g. powder), commonly termed in the industry "fines" (typical particle size of <1.0 mm), suitably selected from at least one of: "ultrafines" (typical particle size of <0.5 mm/500 μm), and "microfines" (typical particle size <20 μm), with a crude oil to produce a combined blended product. The concept further extends to the uses of the blended product, including processes for preparing fractionation products, as well as the products produced from the blended product; especially products from fractionation by distillation.

Prior to setting forth the invention in greater detail, a number of definitions are provided that will assist in the understanding of the invention.

As used herein, the term "comprising" means any of the recited elements are necessarily included and other elements may optionally be included as well. "Consisting essentially of" means any recited elements are necessarily included, elements that would materially affect the basic and novel characteristics of the listed elements are excluded, and other elements may optionally be included. "Consisting of" means that all elements other than those listed are excluded. Embodiments defined by each of these terms are within the scope of this invention.

The term 'coal' is used herein to denote readily combustible sedimentary mineral-derived solid hydrocarbonaceous material including, but not limited to, hard coal, such as anthracite; bituminous coal; sub-bituminous coal; and brown coal including lignite (as defined in ISO 11760:2005).

As used herein, the term "ash" refers to the inorganic—e.g. non-hydrocarbon—mineral component found within most types of fossil fuel, especially that found in coal. Ash is comprised within the solid residue that remains following combustion of coal, sometimes referred to as fly ash. As the source and type of coal is highly variable, so is the composition and chemistry of the ash. However, typical ash content includes several oxides, such as silicon dioxide, calcium oxide, iron (III) oxide and aluminium oxide. Depending on its source, coal may further include in trace amounts one or more substances that may be comprised within the subsequent ash, such as arsenic, beryllium, boron, cadmium, chromium, cobalt, lead, manganese, mercury, molybdenum, selenium, strontium, thallium, and vanadium.

As used herein the term "deashed coal" or "low ash coal" refer to coal that has a proportion of ash-forming components that is lower than that of its natural state. The related term "demineralised coal" is used herein to refer to coal that has a reduced proportion of inorganic minerals compared to its natural state. The terms "deashed coal" and demineralised coal" may also be used to refer to coal that has a low naturally-occurring proportion of ash-forming components, or minerals respectively.

As used herein, the term "coal fines" refers to coal in particulate form with a maximum particle size typically less than 1.0 mm. The term "coal ultrafines" or "ultrafine coal" or "ultrafines" refers to coal with a maximum particle size typically less than 0.5 mm. The term "coal microfines" or "microfine coal" or "microfines" refers to coal with a maximum particle size typically less than 20 μm.

As used herein, the term "water content" refers to the total amount of water within a sample, and is expressed as a concentration or as a mass percentage (% m). When the term refers to the water content in a coal sample it includes the inherent or residual water content of the coal, and any water or moisture that has been absorbed from the environment. As used herein the term "dewatered coal" refers to coal that has an absolute proportion of water that is lower than that of its natural state. The term "dewatered coal" may also be used to refer to coal that has a low naturally-occurring proportion of water.

The term "crude oil" is used herein to refer to geologically-derived liquid hydrocarbonaceous petroleum. Crude oil may be referred to as unrefined oil. The term "refining" as used herein refers to any process that removes impurities or unwanted elements from a substance, for example crude oil. The term "crude" or "unrefined" in relation to a substance may therefore mean any substance that has yet to be refined, or separated, or purified, or further purified, to provide a more pure substance. The term "crude oil" or "unrefined oil" may relate to oil in the state that it was extracted and will also be understood to include oil which has been subjected to water-oil separations and/or gas-oil separation and/or desalting and/or stabilization. Any crude oil is suitable as the source material for the process of this invention, including Arabian Heavy, Arabian Light, other Gulf crudes, Brent, North Sea crudes, North and West African crudes, Indonesian, Chinese crudes and mixtures thereof, but also shale oil, condensates, tar sands, gas condensates and bio-based oils. Crude oil and may be obtained from a variety of natural sources including, but not limited to: drilling into rock strata; fracking; and/or oil sand extraction. "Sweet crude oil" is a type of petroleum. The New York Mercantile Exchange designates petroleum with less than 0.42% m sulfur as sweet. Petroleum containing higher levels of sulfur is called "sour crude oil".

The term "fractionation" is used herein to refer to the separation of a mixture into different portions. The term "fractionation" will encompass a separation process in which a certain quantity of a mixture (gas, solid, liquid, or suspension) is divided during a phase transition, into a number of smaller quantities (fractions) in which the composition varies according to a gradient. Fractionation includes "fractional distillation" which is the separation of a mixture into its component parts, or fractions, based on differences in their boiling point. Any distilled output product from a fractionation technique may be termed "fractionation products". The viscous residue from atmospheric fractional distillation may be used as a feedstock for further upgrading via vacuum distillation, as a fuel component, or to contribute to a bituminous fraction. Fractionation, or fractionated, products have fewer components, or are more pure than the unrefined products from which they derive. Typically, atmospheric distillation of crude oil is completed at temperatures ranging from around 300 to around 350° C. at, or near, atmospheric pressure. The atmospheric reside may then be passed to a vacuum distillation unit that operates at around 350° C. with around 40 mmHg (approximately 53 millibar) of vacuum.

The term "dispersant additive" as used herein refers to a substance added to a mixture to promote dispersion or to maintain dispersed particles in suspension.

The term "hydrocarbonaceous material" as used herein refers to a material containing hydrocarbons; hydrocarbons being an organic compound consisting substantially of the elements hydrogen and carbon. Hydrocarbonaceous material may comprise aliphatic as well as aromatic hydrocarbons Crude oil is expensive and is a non-renewable source of energy. Coal-fines are generally regarded as a waste product and are available cheaply and in plentiful supply. One problem addressed by an embodiment of the present invention is to provide an improved source of fractionated fossil fuel derived products. Surprisingly, the blended coal—crude oil product provided can be subjected to fractionation by distillation, to produce resultant distillate products that are less expensive than current alternatives, yet still meet required product and environmental emission criteria. As the amount of crude oil per unit volume is reduced in the blend, the process allows users to "stretch" their existing crude oil supply utilising a cheaper hydrocarbon source that previously may have been considered a waste by-product of coal mining.

There has been previous research into methods of converting coal into liquid hydrocarbon products: these mainly involve solvent extraction of coal at temperatures above 400° C. under pressure in the presence of hydrogen or a hydrogen donor solvent, e.g. tetralin (1,2,3,4-tetrahydronaphthalene). This has led to several pilot scale developments and at least one full-scale operating plant using the Shenhua process at Ejin Horo Banner, Ordos, Inner Mongolia, China. Exploitation of this process involves, however, a very large capital investment and high associated running costs.

Traditional coal carbonisation and gasification processes involving pyrolysis of coal can also lead to the collection and distillation of coal tars and liquid hydrocarbon products.

It was not previously known that co-distillation of crude oil and coal-fines, particularly comprising micro- and nanoscale coal particulates, would provide significant amounts of valuable distillate products at temperatures well below 400° C. These amounts are in addition to those distillate products attributable to the distillation of the crude oil component and are therefore attributable to the presence of coal.

Without wishing to be bound by theory, it is understood that when distilling coal fines as a blend with crude oil, any coal tars and liquids generated during pyrolysis are condensed together with the traditional distillate fractions from crude oil. In addition, the presence in crude oil of various hydrocarbon species that could act as hydrogen donors to facilitate breakdown of the coal polymeric structure could enhance the generation of condensable hydrocarbons. Utilising existing process equipment, i.e. an oil refinery atmospheric distiller and a vacuum distiller, to generate such hydrocarbons and pyrolysis tar from coal avoids large-scale investment in major new manufacturing facilities. This represents a significant advantage in economic terms of the present invention.

While the invention encompasses the distillation of crude oil blended with coal-fines of any specification to produce distillate products. An embodiment of the invention relates to the distillation of crude oil blended with coal-fines, wherein the coal-fines have a specification, in particular, a water content and an ash content that provides, following distillation, distillate products that meet the appropriate product and environmental emission criteria for these products. Distillate products that meet or exceed the required specification for the product type are of higher value and therefore make the overall process increasingly commercially viable.

Recent developments processing of coal fines have made available a microfine coal product that has a low water content (<15% m, suitably <3% m) and a low ash content (<10% m, suitably <2% m). The process of demineralisation also has a beneficial effect on sulphur content via removal of iron pyrites. Demineralising and dewatering of coal fines is typically achieved via a combination of froth flotation separation, specifically designed for ultrafines and microfine particles, plus mechanical and thermal dewatering techniques. A typical process for the production of de-watered coal ultrafines is provided in US-2015/0184099, which describes a vibration assisted vacuum dewatering process. It will be appreciated, however, that several other suitable dewatering processes also exist within the art for example, providing coal as cake comprising coal fine particles in a hydrocarbon carrier, water having been removed through the use of one or more hydrophilic solvents.

Any particle size of coal fines that is suitable for distillation with crude oil is considered to be encompassed by the invention. Suitably, the particle size of the coal fines is in the ultrafine range. Most suitably the particle size of the coal fines is in the microfine range. Specifically, the maximum average particle size may be at most 500 µm. More suitably, the maximum average particle size may be at most 300 µm, 250 µm, 200 µm, 150 µm, or 100 µm. Most suitably, the maximum average particle size may be at most 50 µm, 40 µm, 30 µm, 20 µm, 10 µm, or 5 µm. The minimum average particle size may be 0.01 µm, 0.1 µm, 0.5 µm, 1 µm, 2 µm, or 5 µm. Hence, in particular embodiments the invention includes utilisation of nanoscale coal fines with average particle sizes in the sub-micron range.

An alternative measure of particle size is to quote a maximum particle size and a percentage value or "d" value for the proportion by volume of the sample that falls below that particle size. For the present invention any particle size of coal fines that is suitable for distillation with crude oil is considered to be encompassed by the invention. Suitably, the particle size of the coal fines is in the ultrafine range. Most suitably the particle size of the coal fines is in the microfine range. Specifically, the maximum particle size may be at most 500 µm. More suitably, the maximum particle size may be at most 300 µm, 250 µm, 200 µm, 150 µm, or 100 µm. Most suitably, the maximum particle size may be at most 50 µm, 40 µm, 30 µm, 20 µm, 10 µm, or 5 µm. The minimum particle size may be 0.01 µm, 0.1 µm, 0.5 µm, 1 µm, 2 µm, or 5 µm. Any "d" value may be associated with these particle sizes. Suitably, the "d" value associated with any of the above maximum particle sizes may be d99, d98, d95, d90, d80, d70, d60, or d50.

According to a specific embodiment of the invention a process is provided that blends (i.e. suspends) the solid particulate matter of de-watered, demineralised microfine coal in crude oil, prior to fractionation. Upon fractionation at around or slightly above atmospheric pressure, followed by fractionation at reduced pressure, valuable lower distillate products (naphtha: boiling range 85-177° C., kerosene: boiling range 177-232° C. and diesel: boiling range 232-343° C.) are produced in significantly higher amounts than can be accounted for by the distillation of the crude oil component alone. These lower distillate products are, therefore, derived from presence of microfine and/or ultrafine coal.

Hence, according to a specific embodiment of the invention described in more detail below, a crude oil/microfine coal dispersion is pumped either at ambient or elevated temperatures through desalting and pre-heating process units and subsequently into a fractionation column, typically at or around atmospheric pressure. The resultant residue from the atmospheric distillation stage is then transferred to a vacuum distillation plant and further fractionated. Distillate fractions from both atmospheric and vacuum distillation processes can either be used as blend components for final oil products or as feeds for other refinery process units, such as catalytic crackers, hydrocrackers, thermal crackers, visbreakers etc. The vacuum residue may also be further processed by refinery process units, e.g. cokers, visbreakers, etc., or used for bitumen/asphalt manufacture.

This technology upgrades the coal fines product which was previously regarded as a waste byproduct of the mining industry. The overall cost of the crude oil is reduced as is the amount of crude oil per unit of distillate product.

The amount of microfine coal that may be blended with the crude oil is at least 1% m (one mass percent), suitably at least 5% m, typically around 10% m, at most 70% m, suitably at most 60% m, optionally at most 50% m.

The invention is further illustrated by the following non-limiting examples.

EXAMPLES

Example 1a—Demineralising and Dewatering of Coal Fines May be Achieved Via a Combination of Froth Flotation Separation, Specifically Designed for Ultrafines and Microfine Particles, Plus Mechanical and Thermal Dewatering Techniques The coal slurry is screened, collected in a tank and froth flotation agents are added using controlled dose rates. Micro particle separators filled with process water and filtered air from an enclosed air compressor are used to sort hydrophobic carbon materials from hydrophilic mineral materials. Froth containing carbon particles overflows the tank and this froth is collected in an open, top gutter. The mineral pulp is retained in the separation tank until discharged, whereas the demineralised coal slurry is de-aerated, before being pumped to the pelletisation step. Further coal particle size reduction may be achieved, if necessary, by various known milling techniques, including ones where a hydrocarbon oil is used as a milling aid.

Mechanical dewatering of the demineralised microfine coal slurry is carried out via a filter press or tube press. Suitable equipment is manufactured by Metso Corporation, Fabianinkatu 9 A, PO Box 1220. FI-00130 Helsinki, FIN-00101, Finland. The resultant microfine coal wet-cake may be dried thermally to a powder form (suitable equipment is manufactured by GEA Group Aktiengesellschaft, Peter-MOller-Str. 12, 40468 DOsseldorf, Germany) or pelletized before drying. For pelletisation, a specific modifier may be added to the filter cake in a mixer to optimize pelletisation and the modified cake is transported to an extruder where it is compressed into pellets. The demineralised coal pellets are then dried thermally by conveying them to a pellet dryer where oxygen-deprived hot process air is blown directly over the microfine coal pellets. Suitable equipment is manufactured by STELA Laxhuber GmbH, Öttingerstr. 2, D-84323 Massing, Germany.

Example 1 b—Obtaining Coal Microfines by Grinding Larger Lumps and Particles of Coal in Wet Media The type of coal may be selected based on favourable properties of the coal such as low ash or water content or ease of grindability (e.g. high Hardgrove Grindability Index) or reactivity. Coal microfines were obtained by a variety of standard crushing and grinding size reduction techniques in wet media followed by dewatering.

1. Crush to reduce production washed, wet coal (e.g. coal D or coal F, Table 3) from 50 mm or thereabouts to approximately 6 mm, e.g. via a high pressure grinding roller mill or jaw crusher: suitable equipment is manufactured by Metso Corporation or FLSmidth, Vigerslev Alle 77, DK-2500 Valby, Copenhagen, Denmark.
2. Produce a wet <6 mm slurry and reduce to 40 μm with a suitable ball mill, rod mill or stirred media detritor: suitable equipment is manufactured by Metso Corporation.
3. Reduce the <40 μm slurry to <1 μm or thereabouts using a nanomill, suitably either by use of a peg mill, horizontal disc mill or vertical stirred media detritor: suitable equipment is manufactured by NETZSCH-Feinmahltechnik GMBH, Sedanstrale 70, 95100 Seib, Germany, or Metso Corporation, IsaMill™ can also be used to reduce particle size to <5 μm or lower by attrition and abrasion: Glencore Technology, Level 10, 160 Ann St, Brisbane QLD 4000. Australia.
4. Dewater from approximately 50% m to <20% m or thereabouts, with a tube press operating at high pressures through a membrane or a vertical plate pressure filter: suitable equipment is manufactured by Metso Corporation. Alternative dewatering methods include filter presses e.g. Andritz AG, Stattegger Strasse 18, 8045 Graz, Austria.
5. Dewater to <2% m by:
    a. thermal drying, such as fluidised bed, rotary, flash or bell dryers: suitable equipment is manufactured by companies, such as GEA Group Aktiengesellschaft, Peter-Müller-Str. 12, 40468 Düsseldorf, Germany and Stela Laxhuber GmbH, Laxhuberplatz 1, 84323 Massing, Germany.
    b. solvent-dewatering techniques with alcohols, ethers or ketones as described for example in U.S. Pat. Nos. 3,327,402, 4,459,762 and 7,537,700.

Example 1c—Obtaining Coal Microfines by Grinding Larger Lumps and Particles of Coal in a Dry State Coal microfines were obtained by standard crushing, grinding and pulverising size reduction techniques in a dry state.
1. Crush dry, raw seam coal with a jaw crusher to <30 mm size.
2. Pulverise dried coal from <30 mm to <45 μm size or thereabouts using ball mills with classifiers or by using centrifugal attrition mill: suitable equipment is manufactured by Loesche GmbH, Hansaallee 243, 40549 Düsseldorf, Germany and Atritor Limited, 12 The Stampings, Blue Ribbon Park, Coventry, West Midlands, CV6 5RE, UK.
3. Reduce to <1 μm particle size or thereabouts with an air microniser (or jet mill): suitable equipment is manufactured by British Rema Process Equipment Ltd. Foxwood Close, Chesterfield, S41 9RN, U.K.

Example 1d—Obtaining Microfine Coal-Fuel Oil Cake by Grinding Dry Coal with a Fuel Oil or Similar Oil Product A cake of microfine coal in crude oil is obtained by grinding dry coal with crude oil or related petroleum product as the fluid medium (see Example 1b above) in a Netzsch Laboratory Agitator Bead Mill apparatus or a Metso Stirred Media Detritor.

Figure 2:
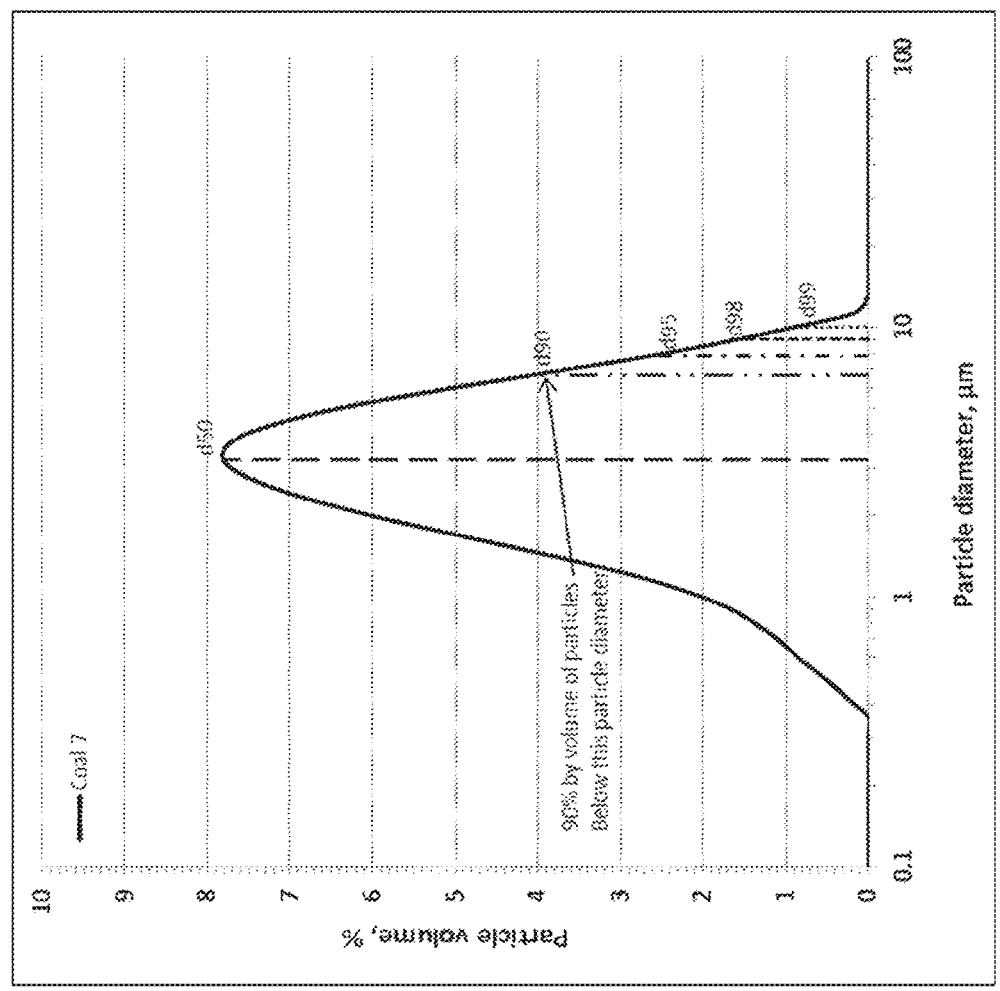
FIG. 2 is a graph that shows particle size distribution of exemplary coal sample 7, an Australian highly volatile bituminous coal, as determined by laser scattering showing the characteristic size parameters: d50, d90, d95, d98 and d99.

Particle size distributions are typically determined by a laser scattering method which measures the particle volume of particles between a series of incremental size ranges. FIG. 2 illustrates the particle size distribution of coal 7 (described in Table 3 below). Above a particle size of 63 μm it is possible practically to separate coal into different size fractions by sieving, thus coal sample 6 was prepared between the two sieve sizes 63 μm and 125 μm, Table 3.

Typically the particle distribution width is quantified by particle diameter values on the x-axis, d50, d90, d95, d98 and d99, as shown in FIG. 2. d50 is defined as the diameter where half of the population lies below this value. Similarly, ninety percent of the distribution lies below the d90, ninety-five percent of the population lies below the d95, ninety-eight percent of the population lies below the d98 and ninety-nine percent of the population lies below the d99 value.

Example 2a—Suspension of Microfine Coal in Crude Oil May be Achieved Via High-Shear Mixing of Various Forms of Microfine Coal Dried microfine coal powder, a dried pellet of microfine coal, or microfine coal mixed with hydrocarbon oil in the form of a cake, is de-agglomerated and dispersed in crude oil using a high-shear mixer in a vessel. If necessary, a dispersant additive is included in the blend to ensure sufficient storage stability. Optionally, the vessel may be fitted with an ultrasonic capability to induce cavitation to enhance de-agglomeration. Shear mixing is carried out either at ambient temperatures or, for more viscous crude oils, at elevated temperatures typically up to 50° C. Suitable shear mixers are manufactured by Charles Ross & Son Co. 710 Old Willets Path, Hauppauge, N.Y. 11788 and Silverson Machines Inc., 355 Chestnut St., East Longmeadow, Mass. 01028, USA. This process will typically take place at a distillation plant and the resultant crude oil/microfine coal dispersion may be stored in tanks for short periods or delivered immediately to the distillation plant, typically one found in an oil refinery.

Example 2b—Suspension of Microfine Coal in Crude Oil May be Achieved Via Direct Injection of Coal Fines Powder into Crude Oil Stream or by Direct Injection of the Coal Fines Powder into the Distillation Chamber Dried microfine coal powder can be derived, either by drying a wet cake of microfine coal particles prepared by mechanical drying of froth floated coal fines, by crushing and grinding a dried pellet of microfine coal, or by crushing and grinding of a low ash seam coal. Such dried microfine coal powder is injected in a stream of carrier gas (typically nitrogen, air, or oxygen depleted air or a mixture of these) into a crude oil pre-heat process unit (typically 120-150° C.), electrostatic desalter or final heat process or furnace unit (280-400° C., typically 340-370° C.) prior to introduction of a crude oil stream into a fractionation column, typically at or around atmospheric pressure. Alternatively the dried microfine coal powder thus prepared may be injected directly into the base of the fractionating column.

Example 3—Fractionation of a Blend of North Sea Crude Oil a and West Virginia Microfine Coal 1 Using Standard Small-Scale (200 mL) Distillation Unit Processes and Procedures The crude oil/microfine coal dispersion is pumped either at ambient or elevated temperatures through desalting and pre-heating process units and thence into a fractionation column, typically at atmospheric pressure. The resultant residue from the atmospheric distillation stage is then transferred to a vacuum distillation plant and further fractionated.

A typical light, sweet North Sea crude oil A, (characteristics given in Table 1) was blended with a USA West Virginia low volatile bituminous coal 1 (characteristics given in Table 3) and a set of analytical test results obtained for a range or critical parameters, see Table 2. Addition of 5% m coal 1 to crude oil A surprisingly results in only small increases in density (0.833 to 0.837 g/ml@15° C.), viscosity (5.1 to 5.5 cSt@50° C.) and sulphur content (0.241% to 0.255% m).

TABLE 1

Analyses and distillation characteristics of the crude oils tested

| | | Crude Oil code | | | |
|---|---|---|---|---|---|
| Distillate fraction | Temp, C. | A | B | C | D |
| Density @ 15° C. | kg/m$^3$ | 833 | 805 | 870 | 912 |
| Kinetic Viscosity @ 20° C. | mm$^2$/s | 5.1 | 2.2 | 22.1 | 85 |
| Carbon residue (MCRT) | % m/m | 1.2 | 0.6 | 4.4 | 1.9 |
| Sediment by Hot Filtration | % m/m | <0.01 | 0.01 | 0.01 | 0.01 |
| Pour Point ° C. | ° C. | −18 | −15 | −30 | −54 |

TABLE 1-continued

| Analyses and distillation characteristics of the crude oils tested | | | | | | |
|---|---|---|---|---|---|---|
| Total Acid Number | mgKOH/g | | 0.09 | 0.05 | 0.09 | 3.2 |
| Ash | % m/m | | <0.001 | 0.001 | 0.01 | 0 |
| Sulphur | % m/m | | 0.24 | 0.18 | 1.7 | 0.4 |

| DISTILLATION RESULTS | | | | | | |
|---|---|---|---|---|---|---|
| | | 200 mL | 15 L volume | | 200 mL volume | |
| Condensates | | n.a. | 2.4 | | n.a. | |
| Low boiling components | <85 | 5.0 | 7.4 | 8.0 | 4.6 | 0 |
| Naphtha | 85-177 | 23.5 | 23.5 | 37.0 | 15.2 | 2.1 |
| Kero | 177-232 | 11.1 | 10.3 | 11.2 | 9.8 | 5.7 |
| Diesel | 232-343 | 21.1 | 21.3 | 21.6 | 19.2 | 28.3 |
| LVGO | 343-427 | 13.8 | 12.0 | 9.6 | 14.1 | 21.7 |
| HVGO | 427-550 | 15.0 | 14.5 | 6.6 | 17.0 | 27.7 |
| Vacuum Residue | >550 | 10.5 | 8.4 | 6.0 | 20.0 | 14.5 |
| Final Boiling Point | ° C. | 607 | | 517 | 542 | 559 |

Surprisingly the carbon residue increased by much less than expected: just 0.55% m from 1.19% m in crude A to 1.74% m for the 5% blend, Table 2. Coal 1 has a combined non-volatile content (fixed carbon plus ash content) of 80.2% m (calculated as 100%–Volatile Matter content). The non-volatile content provides a measure of the amount of carbon and ash content expected to remain after distillation. Based on this the value for the carbon residue of crude oil A with 5% m coal 1, the carbon residue would be expected to increase by approximately 4% m as a result of addition of 5% coal 1. However, the carbon residue increase observed is very much smaller (0.55% m) indicating that the microfine coal is producing far more volatile matter (gaseous and liquid products) when mixed with crude oil than it does when heated alone in a proximate analysis.

TABLE 2

| Analyses for the coal-crude oil blends | | |
|---|---|---|
| Distillate fraction | Temp, C. | 5% coal 1 in crude A |
| Density @ 15° C. | kg/m³ | 837 |
| Kinetic Viscosity @ 20° C. | mm²/s | 5.5 |
| Carbon residue (MCRT) | % m/m | 1.74 |
| Sediment by Hot Filtration | % m/m | 0.74 |
| Pour Point ° C. | ° C. | -9 |
| Total Acid Number | mgKOH/g | 0.09 |
| Ash | % m/m | 0.19 |
| Sulphur | % m/m | 0.26 |

The distillation characteristics for the lowest boiling 50% v from crude oil A, and blends of crude oil A with microfine coal 1, were determined according to the ASTM D86 Standard Test Method for Distillation of Petroleum Products and Liquid Fuels at Atmospheric Pressure. Using a 200 mL sample in a laboratory batch manual distillation unit, the boiling range characteristics of oil products were determined quantitatively under conditions that are designed to provide approximately one theoretical plate fractionation. Regular systematic readings of temperature readings and volumes of condensate are made until the cumulative volume of the liquid distillate fractions reached 50% v, which corresponded in these determinations to distillation temperatures between 270° C. and 280° C.

The distillation characteristics for the 50% v residue from the atmospheric manual distillation of crude oil A, and blends of crude oil A with microfine coal 1 were determined according to the ASTM D1160 Standard Test Method for Distillation of Petroleum Products at Reduced Pressure. This test method covers the determination, at reduced pressures, of the range of boiling points for petroleum products that can be partially or completely vaporized at a maximum liquid temperature of 400° C. The sample is distilled at an accurately controlled pressure between 0.13 kPa and 6.7 kPa (1 mm and 50 mm Hg) under conditions that are designed to provide approximately one theoretical plate fractionation. Data are obtained from which the final boiling point and a distillation curve relating volume percent distilled and atmospheric equivalent boiling point temperature is prepared.

TABLE 3

| Analyses of the range of coals tested | | | | | | | | |
|---|---|---|---|---|---|---|---|---|
| No. | Origin | Geological age | Classification | Ash % m, db | Gross Specific Energy MJ/kg, db | Volatile Matter % m, daf | Vitrinite Reflectance % | S % m, db |
| 1 | Kentucky, | Carbonif- | Low | 8.5 | 31.4 | 19.8 | n.d. | 0.9 |
| 2 | USA | erous | volatile | 2.7 | 34.6 | | 1.03 | 0.7 |
| 3 | | | bituminous | 1.6 | 35.0 | | n.d. | 0.9 |
| 4 | | | High | 1.4 | 33.9 | 38.0 | 0.71 | 0.64 |
| 5 | | | volatile A | 1.9 | 33.7 | | | 0.64 |
| 6 | | | bituminous | 1.4 | 33.9 | | | 0.64 |
| 7 | NSW, | Permian | High | 0.87 | 32.8 | 32.6 | 0.59 | 0.40 |
| 8 | Australia | | volatile B | 1.4 | 33.6 | 33.5 | | 0.40 |

TABLE 3-continued

Analyses of the range of coals tested

| | | | | | | | | |
|---|---|---|---|---|---|---|---|---|
| 9 | Colombia | Paleocene | bituminous | 1.5 | 32.6 | 39.8 | 0.54 | 0.56 |
| 10 | Czech Rep | Carboniferous | Medium volatile | 4.4 | 36.5 | 25.9 | 1.05 | 0.5 |
| 11 | Mongolia | Permian | bituminous | 15.2 | 29.9 | 29.3 | 0.95 | 1.2 |
| 12 | | Jurassic | Sub-bituminous | 6.3 | 30.1 | 44.8 | 0.59 | 0.8 |
| 13 | | Cretaceous | Brown coal | 9.0 | 26.3 | 46.3 | 0.35 | 0.5 |

| | | | | | Particle size distribution | | | | | | |
|---|---|---|---|---|---|---|---|---|---|---|---|
| No. | C | H | N | HGI | d50 | d90 | d95 | d98 | d99 | <100 μm | <10 μm | <1 μm |
| | % m, db | | | | μm | | | | | %, v | | |
| 1 | n.d. | | | n.d. | 5.8 | 12 | 15 | 17 | 20 | 100 | 82 | 7 |
| 2 | n.d. | | | | 4.5 | 15 | 20 | 30 | 34 | 100 | 81 | 8 |
| 3 | 86.6 | 4.5 | 1.2 | | 1.8 | 4.3 | 5.8 | 9.6 | 17.5 | 100 | 98 | 23 |
| 4 | 80.0 | 5.7 | 2.0 | 44 | 17 | 86 | 117 | 153 | 176 | 94 | 40 | 2 |
| 5 | 79.6 | 5.7 | 2.0 | | 4.0 | 15 | 17 | 51 | 95 | 99 | 83 | 7 |
| 6 | 80.0 | 5.7 | 2.0 | | min. 63 μm, max, 125 μm | | | | | | 0 | 0 |
| 7 | 85.0 | 5.8 | 2.0 | n.d. | 3.2 | 6.7 | 7.8 | 9.0 | 10 | 100 | 100 | 8 |
| 8 | 84.5 | 5.8 | 2.0 | | 9.4 | 26 | 36 | 63 | 100 | 99 | 54 | 2 |
| 9 | 79.1 | 5.4 | 1.6 | 36 | 17 | 71 | 90 | 111 | 125 | 98 | 62 | 2 |
| 10 | 89.9 | 4.8 | 1.4 | n.d. | 10 | 33 | 43 | 56 | 65 | 100 | 49 | 2 |
| 11 | n.d. | 4.1 | n.d. | | 8.2 | 33 | 45 | 59 | 69 | 100 | 52 | 8 |
| 12 | 71.8 | 5.1 | | | 13 | 40 | 52 | 66 | 77 | 100 | 46 | 3 |
| 13 | 64.1 | 4.8 | | | 18 | 86 | 106 | 124 | 137 | 96 | 39 | 2 | n.d. = not determined,
db = dry basis,
daf = dry, ash-free basis

TABLE 4

Small-scale Distillation results for coal 1-crude A blends compared with results calculated for equivalent blends containing an inert component

| Distillate fraction | Temp, C. | % CCF in crude (X) | | | | % calculated as inert (Y) | | | % delta* (−X − Y) | | |
|---|---|---|---|---|---|---|---|---|---|---|---|
| | | 0 | 5 | 7.5 | 10 | 5 | 7.5 | 10 | 5 | 7.5 | 10 |
| Low boiling components | <85 | 5.0 | 4.4 | 3.7 | 4.6 | 4.8 | 4.6 | 4.5 | −0.4 | −0.9 | 0.1 |
| Naphtha | 85-177 | 23.5 | 23.9 | 24.4 | 24.1 | 22.3 | 21.7 | 21.1 | 1.6 | 2.7 | 3.0 |
| Kero | 177-232 | 11.1 | 12.4 | 11.9 | 11.3 | 10.6 | 10.3 | 10.0 | 1.8 | 1.6 | 1.2 |
| Diesel | 232-343 | 21.1 | 21.3 | 21.5 | 21.4 | 20.0 | 19.5 | 19.0 | 1.3 | 2.0 | 2.4 |
| LVGO | 343-427 | 13.8 | 13.7 | 12.5 | 10.7 | 13.1 | 12.8 | 12.4 | 0.6 | −0.3 | −1.8 |
| HVGO | >427 | 15.0 | 14.3 | 15.0 | 15.0 | 14.3 | 13.9 | 13.5 | 0.0 | 1.1 | 1.5 |
| Vacuum Residue | | 10.5 | 10.0 | 11.0 | 13.0 | 15.0 | 17.2 | 19.5 | −5.0 | −6.2 | −6.5 |
| % v additional distillates | | | | | | | | | 5.0 | 6.2 | 6.5 |
| % v/m coal conversion to distillates | | | | | | | | | 109% | 91% | 70% |
| % v/m coal conversion to distillates <427° C. | | | | | | | | | 108% | 74% | 55% |
| % v/m coal conversion to distillates <343° C. | | | | | | | | | 95% | 78% | 74% |
| Final Boiling Point, ° C. | | | | | | | | | 552 | 563 | 545 |
| Ash content (coal 1) = 8.5% m | | Ash content of added coal, % m | | | | | | | 0.4 | 0.6 | 0.9 |
| | | Organic coal added, % m | | | | | | | 4.58 | 6.86 | 9.15 |

Notes:
% vol calculated as inert = % vol in distillate fraction × (100 − % m in crude)/100
*Increases in volume between observed and calculated for 5% inert shown in black, volume reductions shown in red.
** calculated assuming all coal mineral matter is collected as ash in the vacuum residue (vac. res.), and a density of 1.0 g/mL for the vacuum residue
*** Yield of vac. res. From organic coal = 100 × (% Vac. Res. blend − % Vac. Res. crude)/% organic coal The volumes of distillate fractions obtained thus (X) for crude oil "A" and for blends of coal 1 at 5% m, 7.5% m and 10% m concentrations in crude oil "A" are shown in Table 4. Boiling point ranges for low boiling components, naphtha, kerosene (kero), diesel, light vacuum gas oil (LVGO) and heavy vacuum gas oil (HVGO) were based on US Energy Information Administration definitions, converted from degrees Fahrenheit (° F.) to degrees Celsius (° C.).

The volumes of these distillate fractions have been calculated (Y) for a 95% m crude oil: 5% m inert material blend (and 92.5% m crude oil, with 7.5% m inert material; 90% m crude oil and 10% m inert material respectively), based on the observed volumes (X), see Table 4. In addition, the volume differences (X-Y) between those observed (X) and those calculated for an inert solid material (Y) are shown. Hence, the value of (X-Y) is a measure of the impact of microfine coal on the distillation characteristics of the crude oil. A positive value (in bold) indicates that an increase in the yield of that fraction has resulted from the presence of microfine coal; whereas a negative value (in italics) shows that a reduction in yield of that fraction has occurred.

Surprisingly, the lower boiling distillates (naphtha, kerosene and diesel) consistently gave higher than expected yields. Equally surprisingly the heavy gas oil distillate fraction, which would be expected to include any coal pyrolysis liquids generated, gave lower yields than expected. The yield of light vacuum gas oil was higher in the 5% m microfine coal blend, but decreased to a yield reduction for the equivalent 7.5% m and 10% m blends. The change in yield of each of these five fractions progressively changed upwards or downwards as the microfine coal proportion was increased from 0% to 5% m to 7.5% m to 10% m. In this case, the total volume of additional distillates increased by 4.7%, 5.8% and 5.8% respectively for 5% m, 7.5% m and 10% m blends respectively. Predominantly the increased distillate was found in the naphtha, kero and diesel fractions.

By correcting for ash content, the % m of organic coal converted to all distillates, distillates <427° C. (i.e. excluding heavy vacuum gas oil) and distillates <343° C. (excluding both light and heavy gas oil fractions) has been calculated. Surprisingly high conversion rates have been achieved (49%-104% volume of distillate per unit mass of coal, % v/m) and clearly a large proportion of the microfine coal 1 has been converted to distillate products in the presence of crude oil A.

The differential yield of vacuum residue increased as expected with increasing proportion of microfine coal 1.

Example 4—Fractionation of Blends of Different Crude Oils and West Virginia Microfine Coals of Different Microfine Particle Size can be Carried Out Using Standard Distillation Unit Processes and Procedure The distillation characteristics for crude oils A, C and D and blends of these crude oils with microfine coals 1, 2 and 3 were determined under atmospheric and reduced pressure according to the procedure described in Example 3.

Crude A is a typical light, sweet North Sea crude oil of low sulphur content producing high yields of the lighter distillates, naphtha and diesel. Crude C is a medium density, sweet crude, also of North Sea origin, but one producing high yields of the heavier fractions: diesel and vacuum gas oils. Crude D is a medium density, sour Russian crude containing much sulphur, which also yields predominantly heavier distillates. Table 1 provides analyses and distillation characteristics for these crudes.

These crude oils were blended with USA West Virginia low volatile bituminous coals 1, 2 and 3 at different concentrations up to 20% m. Coals 1, 2 and 3 have different particle size characteristics, Table 3, such that coal 3 is the most finely ground with 98% particles <10 μm in diameter and a d50 of 1.8 μm (i.e. 50% of the particles are smaller than 1.8 μm). Coals 1 and 2 are relatively similar in size with d50 values of 4.5 μm and 5.8 μm respectively, but coal 1 has a significantly higher ash content of 8.5% compared with 2.7% in coal 2. No systematic differences in coal conversion between coals 1, 2 and 3 were observed suggesting that discrimination of coal particle size within the constraints of the microfine level is not a critical determinant.

As in Example 3, significant volumes of distillates attributable to microfine coal were obtained in all the blends shown in Table 5, with increases in the range 2.3% v to 7.6% v. Again the increased distillate was mainly found in the naphtha, kero and diesel fractions. Even for a higher concentration blend of 20% m coal 2 in crude A, a coal conversion yield of 34% v/m was obtained for distillates <427° C. (i.e. excluding heavy vacuum gas oil).

Significant coal conversion was also observed with blends of crudes C and D with coal 2. For example, a conversion yield to all distillates of 39% v/m was obtained for crude C with 15% coal 2, and a coal conversion yield of 71% v/m was obtained for distillates <343° C. with a blend of 5% coal 2 in the Russian crude D.

It is noteworthy that there is a trend toward a lower final boiling temperature (FBT) as the coal concentration increases, Table 5. This reduces the amount of heavy gas oil that can be collected with the vacuum distillation apparatus. Thus FBP is lowered successively from 607° C. to 550° C. to 516° C. to 479° C., as the concentration of coal 2 in crude A is increased from 0% to 10% m to 15% m and to 20% m respectively. FBP is a measure of the onset of cracking of heavier crude components and limits further distillation because the generation of gas reduces the vacuum being applied. In a full scale distillation plant yields of vacuum gas oil would be expected to be greater as the smaller scale laboratory apparatus suffers from a large difference (typically 50-100° C.) between the temperature at which distillation takes place above the heated vessel and the temperature within the heated vessel itself. Thus in the laboratory apparatus cracking ensues earlier than would be expected in a full scale plant distiller.

TABLE 5

Comparison of small-scale distillation results for blends of USA West Virginia coals 1-3 with crudes A, C and D compared with results calculated for equivalent blends containing an inert component.

| | | Crude Oil code | | | | | | | | |
|---|---|---|---|---|---|---|---|---|---|---|
| | | A | | | | | | | C | D |
| Coal Code | | 1 | | | 2 | | | 3 | | 2 |
| Proportion of coal added (% m) | | 5 | 7.5 | 10 | 10 | 15 | 20 | 5 | 10 | 15 | 5 |
| Test number | | 1 | 2 | 3 | 4 | 5 | 6 | 7 | Gary | 9 | 10 |
| Distillate fraction | Temp, ° C. | % volume delta (observed − calculated) | | | | | | | | | |
| Low boiling components | <85 | −0.3 | −0.8 | 0.2 | 1.5 | 0.0 | −0.2 | 0.1 | 0.8 | 0.3 | 0.0 |
| Naphtha | 85-177 | 1.5 | 2.5 | 2.8 | −0.5 | 2.4 | 3.2 | 2.1 | 1.4 | −0.1 | 0.0 |
| Kero | 177-232 | 1.8 | 1.5 | 1.1 | 4.7 | 1.3 | 1.6 | 1.4 | 1.4 | −0.4 | 1.2 |
| Diesel | 232-343 | 1.2 | 1.9 | 2.2 | −2.3 | 0.5 | 1.9 | −0.1 | −0.9 | 3.8 | 2.3 |
| LVGO | 343-427 | 0.5 | −0.4 | −1.9 | −0.8 | 1.6 | 0.6 | −0.3 | 1.2 | −0.0 | −1.4 |
| HVGO | 427-550 | −0.0 | 1.0 | 1.3 | 0.9 | 2.0 | −3.7 | −0.2 | −1.5 | 2.4 | 0.3 |
| Vacuum Residue | >550 | −5.0 | −5.8 | −6.9 | −3.5 | −7.9 | −3.4 | −3.0 | −2.5 | −6.0 | −2.4 |
| Additional distillate (% obs. − % calc.) | | 4.7 | 5.8 | 5.8 | 3.5 | 7.9 | 3.4 | 3.0 | 2.5 | 6.0 | 2.4 |
| % v/m coal converted to distillates | | 103% | 84% | 63% | 35% | 54% | 17% | 60% | 25% | 41% | 49% |

TABLE 5-continued

Comparison of small-scale distillation results for blends of USA West Virginia coals 1-3 with crudes
A, C and D compared with results calculated for equivalent blends containing an inert component.

| | | | | | | | | | | |
|---|---|---|---|---|---|---|---|---|---|---|
| % v/m coal converted to distillates <427° C. | 104% | 69% | 49% | 26% | 40% | 36% | 64% | 40% | 25% | 43% |
| % v/m coal converted to distillates <343° C. | 92% | 74% | 69% | 35% | 30% | 33% | 71% | 27% | 25% | 72% |
| Final Boiling Point, ° C. | 552 | 563 | 545 | >550 | 516 | 479 | 537 | 492 | 462 | 559 |

Note:
Atmospheric method (ASTM D86) for first 50% distilled,
Vacuum method (ASTM D1160) for residue from atmospheric distillation
* Increases in volume between observed and calculated for 5% inert shown in bold, volume reductions shown in italics Example 5—Fractionation of Blends of Different Crude Oils and Coals of Widely Different Rank, Origin, Particle Size and Mineral Content can be Carried Out Using Standard Distillation Unit Processes and Procedure The distillation characteristics for North Sea crude oils A and B and blends of these crude oils with ten coal samples 4-13 were determined under atmospheric and reduced pressure according to the procedure described in Example 3, see Table 6.

Crude B, like crude A, is a light, sweet North Sea crude oil of low sulphur, but produces even higher yields of the light distillate, naphtha, see Table 1.

These crude oils were distilled with high volatile bituminous coals 4-9 from USA, Colombia and Australia, representing Carboniferous, Paleocene and Permian eras of deposition respectively. In addition, crude A has been tested with 10% additions of medium volatile bituminous coals from Czech Republic and Mongolia, plus sub-bituminous coal and brown coal (lignite) from Mongolia. The latter two coals extend the geological eras included to Jurassic and Cretaceous.

Coals 10-13 increase the range of coal mineral matter contents (assessed as ash content) tested. Coals 3-9 all have ash contents below 2% m dry basis (d.b.). Coal 2 has ash content between 2% m, d.b. and 3% d b. Coals 1, 10, 12, and 13 have ash contents in the range 4% m, d.b. to 9% m, d.b., whereas the ash content of coal 11 is over 15% m, d.b.

Despite the large range of coal rank and ash content covered by coals 10-14, significant % volume of distillate per unit mass of coal (% v/m) conversions of organic coal were observed ranging from:—
- 15-52% v/m for all distillates,
- 33-58% v/m for distillates <427° C.,
- ~75% v/m for distillates <343° C. (note that the brown coal which contains high inherent moisture and a high oxygen content produced an unusually high volume of low boiling components which may have contained significant amounts of water).

Coals 5 and 7 are microfine coals with particle sizes (d50 of 4.0 μm and 3.2 μm respectively) similar to coals 1-3 used in Examples 3 and 4. Coals 11, 9 and 10 are coarser in size with d50 of 8.2 μm, 9.4 μm and 10 μm respectively, whereas coals 4, 7, 12 and 13 are coarser still with d50 in the range 13-18 μm. Coal 6 was prepared by sieving between 63 μm and 125 μm and contained the largest particle sizes tested. As coal particle size increases co-distillation with crude becomes more problematic, but not insolvable. Vacuum distillation of crudes with coarser coal samples 4 and 7 was less stable and more difficult to control. Furthermore the dispersion of the 63-125 μm coal 8 in crude B began to break down after 30 minutes affecting the smooth operation of the atmospheric distillation. Despite these operational differences, significant % conversions of organic coal were still observed ranging from:—

TABLE 6

Comparison of small-scale distillation results for blends of a range of coals of different rank, origin and particle size with crudes A and B compared with results calculated for equivalent blends containing an inert component

| | | Crude Oil code | | | | | | | | |
|---|---|---|---|---|---|---|---|---|---|---|
| | | A | | A | | B | | A | | |
| Coal Code | | 4 | | 5 | | 6 | | 7 | | 8 |
| Proportion of coal added (% m) | | 5 | 10 | 5 | 10 | 10 | 10 | 10 | 15 | 5 | 10 |
| Test number | | 11 | 12 | 13 | 14 | 15 | 16 | 17 | 18 | 19 | 20 |
| Distillate fraction | Temp, ° C. | % volume delta (observed − calculated) | | | | | | | | |
| Low boiling components | <85 | *-0.1* | 0.5 | *-0.2* | 1.4 | 0.2 | 0.2 | 2.3 | 2.5 | *-0.1* | 1.4 |
| Naphtha | 85-177 | 1.8 | 1.4 | 1.7 | 1.5 | 1.1 | 0.3 | *-0.3* | 0.7 | 2.1 | 1.3 |
| Kero | 177-232 | 1.2 | 2.2 | 0.7 | *-0.5* | 2.2 | 2.6 | 1.9 | 2.3 | 0.6 | 1.1 |
| Diesel | 232-343 | *-0.3* | *-0.8* | 0.5 | 1.5 | *-1.1* | 1.9 | *-0.5* | *-0.5* | 0.2 | 0.1 |
| LVGO | 343-427 | *-0.6* | *-0.5* | 0.0 | *-1.8* | 1.8 | *-1.8* | 0.2 | 1.0 | *-1.2* | *-0.2* |
| HVGO | 427-550 | 0.8 | 0.6 | *-0.4* | 0.4 | *-3.7* | 0.1 | 0.9 | *-2.0* | 0.4 | *-3.2* |
| Vacuum Residue | >550 | *-2.8* | *-3.5* | *-2.4* | *-2.5* | *-0.4* | *-3.4* | *-4.5* | *-3.9* | *-2.0* | *-0.4* |
| Additional distillate (% obs. − % calc.) | | 2.8 | 3.5 | 2.4 | 2.5 | 0.3 | 3.3 | 4.5 | 3.9 | 2.0 | 0.5 |
| % v/m coal converted to distillates | | 58% | 35% | 49% | 25% | 3% | 33% | 46% | 27% | 40% | 5% |
| % v/m coal converted to distillates <427° C. | | 41% | 29% | 56% | 21% | 40% | 32% | 36% | 41% | 32% | 37% |
| % v/m coal converted to distillates <343° C. | | 54% | 33% | 55% | 39% | 22% | 50% | 34% | 34% | 56% | 39% |
| Final Boiling Point, ° C. | | 551 | 546 | 555 | 493 | 442 | 481 | 507 | 488 | 546 | 483 |

TABLE 6-continued

Comparison of small-scale distillation results for blends of a range of coals of different rank, origin and particle size with crudes A and B compared with results calculated for equivalent blends containing an inert component

| | | Crude Oil code | | | | | | |
|---|---|---|---|---|---|---|---|---|
| | | A | B | | | | | |
| Coal Code | | 9 | 10 | 11 | 12 | 13 | | |
| Proportion of coal added (% m) | | 5 | 10 | 10 | 10 | 10 | 10 | 10 |
| Test number | | 21 | 22 | 23 | 24 | 25 | 26 | 278 |
| Distillate fraction | Temp, °C. | % volume delta (observed − calculated) | | | | | | |
| Low boiling components | <85 | 0.0 | 1.8 | 0.0 | *−0.4* | 0.5 | *−0.0* | 4.6 |
| Naphtha | 85-177 | 2.0 | 0.1 | 2.6 | 1.8 | 2.0 | 1.3 | 0.9 |
| Kero | 177-232 | 1.6 | 2.6 | 1.0 | 1.7 | 1.6 | 2.2 | 0.5 |
| Diesel | 232-343 | 0.4 | 0.7 | 0.3 | 0.6 | 0.9 | 0.3 | 0.8 |
| LVGO | 343-427 | *−1.4* | 0.2 | 0.7 | 0.1 | *−0.2* | *−0.8* | *−0.8* |
| HVGO | 427-550 | *−0.3* | 0.1 | 0.6 | *−2.2* | *−0.4* | *−1.6* | *−1.5* |
| Vacuum Residue | >550 | *−2.4* | *−5.5* | *−5.4* | *−1.5* | *−4.5* | *−1.5* | *−4.5* |
| Additional distillate (% obs. − % calc.) | | 2.4 | 5.5 | 5.3 | 1.5 | 4.5 | 1.5 | 4.5 |
| % v/m coal converted to distillates | | 50% | 55% | 53% | 15% | 52% | 15% | 49% |
| % v/m coal converted to distillates <427° C. | | 55% | 55% | 47% | 39% | 58% | 33% | 66% |
| % v/m coal converted to distillates <343° C. | | 83% | 53% | 40% | 38% | 59% | 42% | 75% |
| Final Boiling Point, °C. | | 555 | 544 | 486 | 518 | 526 | 520 | 502 |

Note:
Atmospheric method (ASTM D86) for first 50% distilled,
Vacuum method (ASTM D1160) for residue from atmospheric distillation
* Increases in volume between observed and calculated for 5% inert shown in bold, volume reductions shown in italics.

3-55% v/m for all distillates (note that the conversion values below 30% coincided with a low final boiling point (FBP) possibly due to early onset of cracking thereby reducing available heavy gas oil);
21-66% v/m for distillates <427° C.,
22-83% v/m for distillates <343° C.

As in previous examples, significant volumes of distillates attributable to microfine coal were obtained in all the blends shown in Table 6, with increases in the range 1.9% v to 5.3% v (excluding those blends affected by early cracking). Again the increased distillate was mainly found in the naphtha, kero and diesel fractions. In Tests 15 and 20 show lower % coal conversion levels (3% v/m and 5% v/m respectively) than in other tests. This is likely caused by lower FBPs (earlier onset of cracking) in both cases which causes lower yields of HVGO and may be due to higher than usual differential temperatures between the heating vessel and the distillation temperature in this experimental set up.

Example 6—Larger-Scale (15 L) Fractionation of a Blend of North Sea Crude Oil a and West Virginia Microfine Coal 2 can be Carried Out Using Standard Large-Scale Distillation Unit Processes and Procedures The distillation characteristics for the lowest boiling fractions from crude oil A. and blends of crude oil A with microfine coal 2 (5% m, 10% m and 15% m) were determined according to the ASTM D2892-16 Standard Test Method for Distillation of Crude Petroleum (15-Theoretical Plate Column) using a 15 L sample. This test method is one of a number of tests conducted on a crude oil to determine its value. It provides an estimate of the yields of fractions of various boiling ranges and is therefore valuable in technical discussions of a commercial nature. Together with the associated analyses of the fractions collected (see Example 7) this distillation approach is commonly referred to as the Crude Oil Assay and is used as the industry approach to evaluating the suitability of crude oils and their value to an oil refiner.

The residue from the atmospheric distillation was transferred to another distillation flask and redistilled under low vacuum according to ASTM D5238-13 Standard Test Method for Distillation of Heavy Hydrocarbon Mixtures (Vacuum Potstill Method), The maximum achievable atmospheric equivalent temperature (AET) can be as high as 565° C., but is dependent upon the heat tolerance of the charge; for the crude oil A and coal 2-crude oil A blends AETs between 540° C. and 555° C. were achieved. The sample is distilled at an accurately controlled pressure within the range 0.1-0.2 mm Hg).

Approximately 30 separate distillation cut samples were collected for successive temperature ranges from the atmospheric and vacuum distillation combined procedures, and the yield of each of the cuts was measured. Distillation cuts were combined to correspond with each distillate fraction temperature range (e.g. kero) to produce samples for further analysis, and the yields for each distillate calculated, Table 7, for crude oil A, 5% coal 2-crude oil A and 10% coal 2-crude A blends.

Significant % v/m conversion of organic coal were observed for 5%, 10% and 15% blends of coal 2 with crude A ranging from:—
31-52% v/m for distillates <427° C.,
28-35% v/m for distillates <343° C.

The increased distillate was mainly found in the low boiling components, diesel and light vacuum gas oil fractions. The longer dwell time in this laboratory apparatus leads to earlier onset of cracking as in the 200 mL small-scale tests, so the yield data for heavy vacuum gas oil is less reliable.

Example 7—Distillate Fractions Prepared by Larger-Scale (15 L) Fractionation of a Blend of North Sea Crude Oil a and West Virginia Microfine Coal 2 have Properties Closely Similar to the Equivalent Factions Derived from Crude a Alone Many of the properties determined for distillate fractions from large-scale distillation of coal 2-crude A blends show regular small trends as the coal concentration is increased from 0% to 5% to 10%, see Table 8. All these property changes are directionally as expected based on knowledge of crude A and coal 2 properties (e.g. coal structure typically contains more highly aromatic and higher molecular weight units than crude oil), confirming that coal 2 is the origin of part of each fraction. Furthermore these changes are small and would not undermine the quality of the resultant distillate fraction to any significant degree. Thus as coal 2 concentration increases:—

Density increases for light naphtha, light vacuum gas oil and heavy vacuum gas oil fractions;

Viscosity increases for LVGO and HVGO fractions,

Sulphur content increases slightly for Light Naphtha, Heavy Naphtha, LVGO and HVGO;

Copper corrosion improves for Light Naphtha and Heavy Naphtha;

Aromatics content increases for Light Naphtha, heavy Naphtha, Kero and Diesel.

Although particular embodiments of the invention have been disclosed herein in detail, this has been done by way of example and for the purposes of illustration only. The aforementioned embodiments are not intended to be limiting with respect to the scope of the invention. It is contemplated by the inventors that various substitutions, alterations, and modifications may be made to the invention without departing from the spirit and scope of the invention.

TABLE 7

Large-scale Distillation results for coal 2-crude A blends compared with results calculated for equivalent blends containing an inert component

| Distillate fraction | Temp, ° C. | % by volume observed in each distillate fraction (X) | | | | % by volume calculated assuming coal is inert (Y) % coal 2 in crude A | | | % difference between observed and calculated values (X − Y) | | |
|---|---|---|---|---|---|---|---|---|---|---|---|
| | | 0 | 5 | 10 | 15 | 5 | 10 | 15 | 5 | 10 | 15 |
| Condensibles | gaseous | 2.4 | 2.2 | 1.7 | 2.2 | 2.3 | 2.2 | 2.0 | *−0.1* | *−0.5* | 0.2 |
| Low boiling components | <85 | 7.4 | 8.5 | 8.9 | 8.1 | 7.0 | 6.7 | 6.3 | 1.5 | 2.2 | 1.8 |
| Naphtha | 85-177 | 23.5 | 22.2 | 21.2 | 21.4 | 22.4 | 21.2 | 20.1 | *−0.2* | *−0.0* | 1.3 |
| Kero | 177-232 | 10.3 | 9.5 | 8.5 | 9.5 | 9.8 | 9.3 | 8.8 | *−0.3* | *−0.8* | 0.7 |
| Diesel | 232-343 | 21.3 | 20.9 | 21.2 | 18.4 | 20.3 | 19.2 | 18.2 | 0.6 | 2.0 | 0.2 |
| LVGO | 343-427 | 12.0 | 12.3 | 10.5 | 11.2 | 11.4 | 10.8 | 10.2 | 0.9 | *−0.3* | 1.0 |
| HVGO | 427-550 | 14.5 | 11.6 | 12.4 | 7.1 | 13.8 | 13.1 | 12.4 | *−2.2* | *−0.7* | *−5.3* |
| Vacuum Residue | >550 | 8.4 | 12.6 | 15.4 | 22.1 | 13.0 | 17.6 | 22.2 | *−0.4* | *−2.2* | *−0.1* |
| | % v/m coal conversion to distillates <427° C. | | | | | | | | 52% | 31% | 34% |
| | % v/m coal conversion to distillates <343° C. | | | | | | | | 34% | 35% | 28% |
| | Final Boiling Point, ° C. | | | | | | | | >550 | >550 | 516 |
| Ash content (coal 7) = 2.7% m | | Ash content of added coal, % m | | | | | | | 0.14 | 0.27 | 0.41 |
| | | Organic coal added, % m | | | | | | | 4.87 | 9.73 | 14.60 |

* Increases in volume between observed and calculated for 5% inert shown in bold, volume reductions shown in italics.

TABLE 8

Properties of distillate fractions from Large-scale Distillation of coal 2-crude A blends
(values are given in the order 100% crude A→95% crude A 5% coal 2→90% crude A 10% coal 2)

| | Light Naphtha | Heavy Naphtha | Kero | Diesel | LVGO | HVGO |
|---|---|---|---|---|---|---|
| Density (kg/m3 @ 15° C.) | Increases: 0.6794 → 0.691→ 0.694 | Increases marginally: 0.764 → 0.767 → 0.768 | Constant: 0.810-0.811 | Constant: 0.850 → 0.851 → 0.851 | Increases: 0.863 → 0.897→ 0.898 | Increases: 0.916 → 0.918 → 0.919 |
| Viscosity (cSt @ 40° C.) | n.d. | n.d. | Increases marginally: 1.31 → 1.34 → 1.33 | Constant: 3.41 → 3.46 → 3.44 | Increases: 23.5 → 28.3 → 30.2 | Increases (100° C.): 12.1 → 13.2 → 13.6 |
| Sulphur (% m) | Increases: 0.004 → 0.007 → 0.010 | Increases: 0.004 → 0.04 → 0.09 | Increases marginally: 0.01 → 0.01 → 0.016 | Constant: 0.13 | Constant: 0.36 → 0.37 → 0.37 | Increases marginally: 0.49 → 0.50 → 0.51 |
| Nitrogen (ppm,w) | n.d. | n.d. | n.d. | Increases: 17 → 20 → 200 | Increases erratically: 480 → 450 → 580 | Increases erratically: 1400 → 1300 → 1700 |
| TAN (mg(KOH)/g) | n.d. | n.d. | Changes erratically: 0.09 → 0.21 → 0.08 | Changes erratically: 016 → 0.26 → 0.12 | Decreases: 0.35 → 0.28 → 0.24 | Decreases erratically: 0.40 → 0.34 → 0.36 |
| Pour Point (° C.) | n.d. | n.d. | n.d. | n.d. | Increases slightly: 24 → 27 → 27 | Constant at 42° C. |
| Cloud point (° C.) | n.d. | n.d. | n.d. | Increases slightly: −15 → −15 → −12 | n.d. | n.d. |
| Copper corrosion | Improves erratically: 1b → 1a → 1b | Improves: 2a → 1b → 1b | n.d. | n.d. | n.d. | n.d. |
| Aromatics (%, m) | Increase slightly: 4.8 → 5.3 → 5.3 | Increase slightly: 17.5 → 18.1 → 18.2 | Increase: 16.5 → 17.0 → 17.2 | Increase: 21.1 → 22.5 → 24.3 | n.d. | n.d. | n.d. - not determined

The invention claimed is:

1. A process of preparing a coal powder filter-cake, wherein the process comprises the steps of:
   a. Providing a coal feedstock;
   b. Conducting froth flotation on the coal feedstock;
   c. Collecting of the floated coal product to provide a filter-cake; and wherein the filter-cake comprises:
      an ash content of less than 2 wt %, based on the total weight of the filter cake; and
   wherein the filter cake comprises a coal powder comprised of hydrocarbonaceous particles, wherein
      at least 90% by volume (% v) of the hydrocarbonaceous particles are no greater than 100 μm (microns) in diameter,
      at least 50% by volume (% v) of the hydrocarbonaceous particles are no greater than 50 μm (microns) in diameter, and
      the hydrocarbonaceous particles have an average particle size by volume of at most 10 μm in diameter.

2. The process of claim 1, wherein the coal feedstock is pre-ground to provide the required particle size.

3. The process of claim 1, wherein the pre-grinding is conducted using a ball mill, centrifugal attrition mill, rod mill, bead mill, peg mill, horizontal disc mill, or stirred media detritor.

4. The process of claim 1, wherein the filter-cake is de-watered via mechanical, solvent and/or thermal dewatering.

5. The process of claim 4, wherein the thermal dewatering is via fluidized bed, rotary, flash or belt dryers, solvent dewatering is with alcohols, ethers or ketones and mechanical dewatering is carried out via a filter press or tube press.

6. The process of claim 1, wherein the floated coal product is compressed into pellets.

7. The process of claim 6, wherein the pellets are de-watered by blowing oxygen-deprived hot air over the pellets.

8. A process of preparing a pelletized composition comprised of a purified coal powder, wherein the process comprises the steps of:
   a. Providing coal feedstock;
   b. Crushing the coal feedstock to reduce particle size to approximately 6 mm; and
   c. Reducing the particle size of the coal feedstock to provide a reduced particle size coal feedstock having a particle size of approximately 40 microns; and
   d. extruding the reduced particle size coal feedstock to form a pelletized composition,
      wherein the purified coal powder comprises hydrocarbonaceous particles, wherein
         1. at least 90% by volume (% v) of the hydrocarbonaceous particles are no greater than 100 μm (microns) in diameter,
         2. at least 50% by volume (% v) of the hydrocarbonaceous particles are no greater than 50 μm (microns) in diameter, and
         3. the hydrocarbonaceous particles have an average particle size by volume of at most 10 μm in diameter.

9. The process of claim 8, wherein the coal feedstock is crushed in step (b) using a high pressure grinding roller mill or jaw crusher.

10. The process of claim 8, wherein the coal feedstock is reduced in particle size in step (c) using a ball mill, centrifugal attrition mill, rod mill, bead mill, peg mill, horizontal disc mill, stirred media detritor, an air micronizer, or jet mill.

11. The process of claim 10, wherein the ball mill is with or without classifiers.

12. The process of claim 8, wherein the pelletized composition is de-watered is via mechanical dewatering, thermal dewatering, or both.

13. The process of claim 8, wherein the pelletized composition is de-watered by blowing oxygen-deprived hot air over the pellets.

14. The process of claim 10, wherein the pelletized composition has a water content of less than 15 wt % after dewatering.

15. The process of claim 8, wherein the pelletized composition has an ash content of less than 2 wt %.

16. The process of claim 8, wherein the pelletized composition has an ash content of less than 1 wt %.

* * * * *